United States Patent Office 2,920,999
Patented Jan. 12, 1960

2,920,999

21-NITROGEN DERIVATIVES OF CORTICOSTEROIDS

Eugene J. Agnello and Gerald D. Laubach, Jackson Heights, N.Y., assignors to Chas. Pfizer & Co., Inc., New York, N.Y., a corporation of Delaware No Drawing. Application June 7, 1957
Serial No. 664,171

7 Claims. (Cl. 167—65)

This invention relates to 21-nitrogen derivatives of corticosteroids and to a process for their production. In particular, it is concerned with 21-amino derivatives of $\Delta^4$- and $\Delta^{1,4}$-corticosteroids as well as the 21-amino derivatives of $\Delta^{4,6}$-corticosteroids and $\Delta^{1,4,6}$-corticosteroids which are all of value in the treatment of rheumatoid arthritis in view of their anti-inflammatory properties. A process for their preparation is included within the scope of the present invention as are pharmaceutical compositions thereof. This invention also relates to new and useful intermediates necessary for the production of the compounds with which we are concerned, as well as to the method of producing these intermediates.

The 21-aminocorticosteroids included within the purview of the present invention comprise compounds selected from the class consisting of

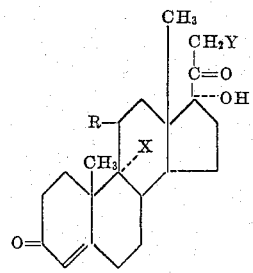

and

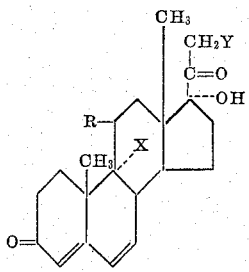

and their $\Delta^1$-dehydro derivatives wherein R is chosen from the group consisting of keto and $\beta$-hydroxyl, X is chosen from the group consisting of $\alpha$-hydrogen, $\alpha$-fluorine, $\alpha$-chlorine, $\alpha$-bromine, $\alpha$-iodine, and Y is chosen from the group consisting of amino, monoalkylamino, dialkylamino, phenylamino, pyridylamino, benzylamino, picolinylamino, N-alkyl-N-phenylamino, N-alkyl-N-pyridylamino, morpholino, pyrryl, pyrrolidyl, piperidino and C-alkylated piperidino. In this instance, the alkyl group has from one to six carbon atoms. There are also included in this invention pharmaceutical compositions comprising compounds as described above together with a pharmaceutically acceptable carrier. This invention also includes acid salts of the compounds described herein; these acid salts are non-toxic mineral acid salts, such as the hydrochloride, hydrobromide, hydroiodide, nitrate, sulfate and phosphate, and organic acid salts, such as the acetate, citrate, tartrate fumarate, maleate, gluconate and saccharate.

The compounds described herein are particularly useful as anti-inflammatory agents for the treatment of rheumatoid arthritis having special advantages over those previously disclosed in the prior art in that they possess this effect to a very high degree without exhibiting sodium retention properties. The acid salts of these 21-aminocorticosteroids are of particular value with regard to water solubility. Therefore, this invention comprises water-soluble anti-inflammatory agents, useful in the treatment of rheumatoid arthritis, which are chosen from the group consisting of the 21-amino derivatives of $\Delta^4$- and $\Delta^{4,6}$-corticosteroids as well as their $\Delta^1$-dehydro derivatives, and the acid salts of all these compounds.

In accordance with the process of this invention, suitable starting materials for the synthesis of the compounds described herein are the 21-halo or -sulfonyl ester derivatives of corticosteroids such as cortisone, hydrocortisone, prednisolone, $\Delta^{1,4,6}$-corticoids and the 9$\alpha$-halo derivatives of all these compounds. Examples of these starting materials includes the 21-iodo, -bromo and -tosyl derivatives of $\Delta^{1,4}$- and $\Delta^{4,6}$-pregnadiene-11$\beta$, 17$\alpha$, 21-triol-3,20-dione, the 21-iodo, -bromo and -tosyl derivatives of $\Delta^{1,4,6}$-pregnatriene-11$\beta$, 17$\alpha$, 21-triol-3,20-dione, and their 9$\alpha$-halo derivatives, such as 9$\alpha$-fluoro, 9$\alpha$-chloro, 9$\alpha$-bromo and 9$\alpha$-iodo. In a co-pending U.S. patent application, Serial No. 654,984, filed on April 25, 1957, there is described by E. J. Agnello and G. D. Laubach the preparation of some of these compounds. The process of this invention comprises contacting the above described 21-iodo, -bromo, and -tosyl derivatives of various corticosteroids with a nitrogen compound chosen from the group consisting of ammonia, monoalkylamines, dialkylamines, monoarylamines, monoaralkylamines, N-alkyl-N-arylamines, morpholine, pyrrole, pyrrolidine, piperidine and C-alkylated piperidines wherein the alkyl group has from one to six carbon atoms and the aryl group is selected from the class consisting of phenyl and pyridyl moieties. The 21-iodo and -bromo atoms and the 21-sulfonyl ester group of the corticosteroids are all readily susceptible to replacement by the amino group; the preferred starting materials for the process of this invention are the 21-iodo-$\Delta^4$-corticosteroids.

A preferred embodiment of the process of this invention is carried out by contacting the 21-iodo, -bromo and -sulfonyl ester derivatives of the herein described corticosteroids with the desired organic amine in a polar organic solvent medium, said process being conducted at a temperature in the range of from about 20° to about 200° C.; the 21-sulfonyl ester derivatives include the methanesulfonyl, ethanesulfonyl, benzenesulfonyl and p-toluenesulfonyl esters. In practice, it is found most convenient to dissolve a 21-halo or -tosyl derivative and the organic amine reagent in a polar organic solvent, such as dioxane, dimethylformamide, dimethylacetamide or a lower alkanol, e.g., methanol, ethanol, isopropanol, etc., or an excess of the organic amine may be employed as the solvent. Inasmuch as the 21-aminosteroid formed by this process may further react with the 21-halosteroid, a large excess of the organic amine reagent per mole of 21-halosteroid is preferably employed.

The process of this invention may be most conveniently carried out at a temperature range of from about room temperature to about the boiling point of the organic amine reagent although it is preferably conducted in the range of about 50° to about 180° C. In practice, it is most convenient to employ a steam bath for heating purposes or to heat the reactants under reflux in an inert atmosphere, such as nitrogen. The preferred and most desirable temperature for this process whereby optimum results are obtained is in the range of from about 100° to about 150° C. when the process is conducted in a sealed tube. The time period for carrying out this reaction can be anywhere in the range of from about 15 minutes to 24 hours, the preferred time period being in the range of from about one to about seven hours.

Upon termination of the reaction, the desired product is obtained by evaporation of the organic solvent and excess organic amine reagent in vacuo to afford a crude crystalline residue of the 21-aminosteroid acid salt; the latter is then triturated with a dilute aqueous solution of an alkaline base. The alkaline base material can be chosen from the group consisting of alkali metal hydroxides, such as sodium hydroxide, potassium hydroxide, etc., alkaline earth metal hydroxides, such as calcium hydroxide, barium hydroxide, etc., and alkali metal carbonates and bicarbonates, such as sodium bicarbonate, sodium carbonate, and lithium carbonate. At any rate, a sufficient amount of base must be present to decompose the 21-aminosteroid hydrohalide salt and liberate the free amine itself.

As an alternative to the above isolation procedure, the cooled reaction mixture containing the 21-aminosteroid acid salt may be treated with a 5% aqueous solution of the alkaline base and the resulting aqueous solution extracted with a water-immiscible organic solvent, such as ether, benzene or a chlorinated hydrocarbon, e.g., methylene chloride, chloroform, carbon tetrachloride, ethylene dichloride and tetrachloroethylene. After the organic layer is separated, it is washed with an aqueous phase and then dried over a suitable drying agent, such as anhydrous sodium sulfate or anhydrous magnesium sulfate. The filtered solution is then evaporated in vacuo to about one quarter of its original volume and subsequently cooled in an ice-bath so as to induce crystallization, or it may even be evaporated to dryness, if so desired; in the latter instance, the crystalline mass should be triturated with a suitable solvent such as chloroform or ethyl acetate, etc. The product so obtained can then be further purified by recrystallization from a suitable organic solvent, such as ethyl acetate or acetone.

Hence, this invention encompasses the herein described $\Delta^4$- and $\Delta^{4,6}$-corticosteroids and their $\Delta^1$-dehydro derivatives, all possessing adrenocortical activity, and a process for producing these compounds, which comprises introducing an amino group at the 21-position. The water solubility of these compounds is such that they may be administered in the form of an aqueous suspension, while their acid salts may be administered intravenously in the form of a sterile aqueous solution. They may also be administered by other routes, such as orally, subcutaneously, and intramuscularly, either alone or in combination with an acceptable pharmaceutical carrier. In general, the dosage of these compounds is approximately of the same order of magnitude as that for cortisone, hydrocortisone, and prednisone, in place of which they are used to treat similar types of pathological conditions. However, in view of their great adrenocortical activity, it is sometimes possible to use dosages of these compounds which are lower than those employed with cortisone. The chief advantages of all these compounds is that they all possess a relatively greater anti-inflammatory effect that a glycogenic effect and hence, are of superior therapeutic value.

A convenient method of sterilizing a solution of the salts of these compounds for use in pharmaceutical compositions is afforded by means of filtration through a Seitz filter. The salts of these compounds of this invention may also be used in aqueous solvents containing other solutes; for example, sufficient saline or glucose to render the solution isotonic. The 21-aminosteroids may also be combined with a variety of pharmaceutically acceptable carriers, the selection of which will depend upon the desired method of administration. For example, the compound may be administered orally in the form of tablets containing a filler material such as starch, or as an elixir or aqueous suspension in a carrier containing a sweetening or flavoring agent; or it may be administered topically in ointment or salve form in suitable bases, such as petrolatum.

The non-toxic mineral acid salts and the organic acid salts of the 21-aminosteroids which are included within the scope of this invention are conveniently prepared by treating the 21-aminosteroid with the desired acid in an aqueous organic solvent medium. The hydrohalide salts may also be prepared under anhydrous conditions by dissolving the 21-aminosteroids in an organic solvent, such as ethyl ether, absolute alcohol or acetone, and passing the appropriate hydrohalide gas into the solution. Furthermore, the hydrobromide and hydroiodide salts of these 21-aminosteroids have been obtained as final products in the process of this invention when the step comprising treatment with alkaline base material is omitted.

This invention is further illustrated by the following examples, which are not to be considered as imposing any limitation thereon.

*Example I*

360 mg. of 21-iodo-$\Delta^{4,6}$-pregnadiene-11$\beta$, 17$\alpha$-diol-3,20-dione and 5 ml. of piperidine were reacted by heating in a nitrogen atmosphere at 100° C. for about 15 minutes. After cooling to room temperature, the reaction mixture was made alkaline with 5% sodium bicarbonate and extracted with two portions of chloroform, the volume of each portion being approximately one-half that of the aqueous layer. The chloroform extract was then washed with three successive portions of an equal amount of water and dried over anhydrous sodium sulfate. After removing the drying agent by filtration and evaporating the chloroform solvent in vacuo, a crystalline residue was obtained. The latter was then triturated with ethyl acetate and there was obtained 250 mg. of the desired product; it was further purified by recrystallization from ethyl acetate. The 21-N-piperidino-$\Delta^{1,4}$-pregnadiene-11$\beta$, 17$\alpha$-diol-3,20-dione has the following physical properties: M.P. 178.5–182.8° C. (dec.);

$$\lambda_{max.}^{alc.} \; 244 \; m\mu \; (\epsilon = 13,400)$$

*Analysis.*—Calcd. for $C_{26}H_{37}NO_4$: C, 73.00; H, 8.72. Found: C, 73.20; H, 9.30.

In addition, the 9$\alpha$-halo derivatives of this compound were all prepared by this method. For example, by employing 9$\alpha$-fluoro-21-iodo-$\Delta^{4,6}$-pregnadiene-11$\beta$, 17$\alpha$-diol-3,20-dione as a starting material in this reaction, there was obtained 21-N-piperidino-9$\alpha$-fluoro-$\Delta^{4,6}$-pregnadiene-11$\beta$, 17$\alpha$-diol-3,20-dione. In a similar manner, 21-N-piperidino-9$\alpha$-fluoro-$\Delta^{1,4,6}$-pregnatriene-11$\beta$, 17$\alpha$-diol-3,20-dione was also prepared.

The 21-iodocorticosteroids employed were all prepared from the corresponding 21-tosyl esters via sodium iodide as specifically described in co-pending application Ser. No. 654,984, filed April 25, 1957; the procedure for the tosylation of the 21-hydroxy group of the corresponding corticosteroid is also set forth in the above mentioned patent application.

*Example II*

4.7 g. (0.01 mole) of 21-iodo-$\Delta^{4,6}$-pregnadiene-11$\beta$, 17$\alpha$-diol-3,20-dione and 2.9 g. (0.04 mole) of diethylamine were dissolved in 20 ml. of ethyl alcohol. This solution was placed in a sealed tube and heated at 100–150° C. for a time period of about four hours. Upon the completion of the reaction, ethyl alcohol and excess diethylamine were removed by evaporation in vacuo, and there was obtained a crystalline residue. The latter was then triturated with a 5% aqueous solution of sodium bicarbonate in sufficient amount to afford at least 1.5 g. (0.0125 mole) of the alkaline base. The crystalline product was then washed with water and air-dried; recrystallization of this material from ethyl acetate afforded pure 21-diethylamino-Δ⁴,⁶-pregnadiene-11β, 17α-diol-3,20-dione.

Example III 4.7 g. (0.01 mole) 21-iodo-Δ⁴,⁶-pregnadiene-11β, 17α-diol-3,20-dione and 4.3 g. (0.04 mole) of N-methyl aniline were refluxed for about four hours in a nitrogen atmosphere. After the reaction was complete, the excess amine solvent was removed by evaporation in vacuo and the 21-aminosteroid hydroiodide isolated by crystallization. Upon treatment of this salt with an equivalent amount of sodium bicarbonate in an aqueous medium the desired 21-amino-Δ⁴-corticosteroid was liberated. It was then isolated by extraction of the aqueous medium with chloroform, followed by subsequent evaporation of the solvent in vacuo until crystallization commenced. The product so obtained was filtered, washed with ethyl acetate and air-dried to afford pure 21-N-methyl-N-phenylamino-Δ⁴,⁶-pregnadiene-11β, 17α-diol-3,20-dione.

Example IV 21-diethylamino-Δ⁴,⁶-pregnadiene - 11β, 17α-diol - 3,20-dione was dissolved in absolute alcohol and hydrogen chloride gas was passed into the solution until saturation was complete. The crystalline precipitate, which formed immediately, was filtered, washed with ether and air-dried. It proved to be 21-diethylamino-Δ⁴,⁶-pregnadiene-11β, 17α-diol-3,20-dione hydrochloride. In a similar manner, the hydrobromide and the hydroiodide acid salts of this compound were also prepared.

Example V

21 - N - diethylamino - Δ⁴,⁶ - pregnadiene-11β,17α-diol-3,20-dione was suspended in water and treated with an equivalent amount of glacial acetic acid. The aqueous medium was extracted with chloroform to remove any 21-aminosteroid starting material and the resulting aqueous layer evaporated in vacuo until crystallization commenced. The product obtained was 21-diethylamino-Δ⁴,⁶-pregnadiene-11β,17α-diol-3,20-dione acetate. In a similar manner, the citrate, tartrate, fumarate, maleate, gluconate and saccharate acid salts of this compound were also prepared; in addition, the mineral acid salts described in Example IV were also prepared by this method as were the nitrate, sulfate and phosphate acid salts of these 21-aminosteroids.

Example VI

The procedures described in Examples I, II, III, IV and V were followed here except that the starting material employed was 21-iodo-Δ⁴-pregnene-11β,17α-diol-3,20-dione. In a similar manner, other starting materials used were 21 - iodo-Δ¹,⁴-pregnadiene-11β,17α-diol-3,20-dione and 21-iodo-Δ¹,⁴,⁶-pregnatriene-11β,17α-diol-3,20-dione, as were the 9α-halo derivatives of all these compounds, specifically 9α - fluoro - 21 - iodo-Δ⁴-pregnene-11β,17α-diol-3,20-dione, 9α-fluoro-21-iodo-Δ¹,⁴-pregnadiene-11β-17α-diol-3,20-dione and 9α-fluoro-21-iodo-Δ¹,⁴,⁶-pregnatriene-11β,17α-diol-3,20-dione and their 9α-chloro, 9α-bromo and 9α-iodo analogues. Typical products of this series include 21-diethylamino-9α-fluoro-Δ⁴-pregnene-11β,17α-diol-3,20-dione, 21-diethylamino-9α-fluoro-Δ¹,⁴-pregnadiene-11β,17α-diol-3,20-dione, 21-diethylamino-9α-fluoro-Δ¹,⁴,⁶-pregnatriene-11β,17α-diol-3,20-dione and the piperidino derivatives of these corticosteroids, as well as 9α-chloro, 9α-bromo and 9α-iodo analogues of all these compounds.

Example VII

21 - iodo-Δ⁴,⁶-pregnadiene-11β,17α-diol-3,20-dione was reacted with various other amines according to the procedures described in Examples I and II, specifically ammonia, methylamine, ethylamine, dimethylamine, aniline, N-ethylaniline, benzylamine, N-methyl-N-benzylamine, N-methyl-N-(2-pyridyl) amine, pyrrole, pyrrolidine and C-alkylated piperidines, such as 2-methylpiperidine, 2,4-dimethylpiperidine and 2,4,6-trimethyl-piperidine. The corresponding 21-substituted aminosteroids were obtained and their acid salts were subsequently prepared according to the procedures described in Examples IV and/or V.

What is claimed is:

1. A compound selected from the class consisting of

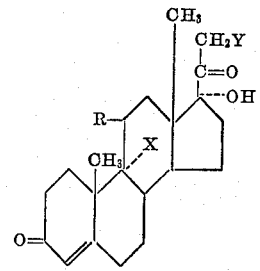

and

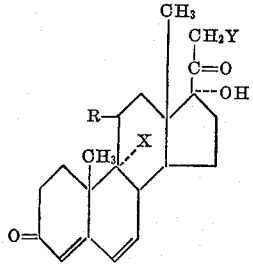

and their Δ¹-dehydro derivatives wherein R is chosen from the group consisting of keto and β-hydroxyl, X is chosen from the group consisting of α-hydrogen, α-fluorine, α-chlorine, α-bromine and α-iodine, and Y is chosen from the group consisting of amino, monoalkylamino, dialkylamino, phenylamino, pyridylamino, benzylamino, picolinylamino, N-alkyl-N-phenylamino, N-alkyl-N-pyridylamino, morpholino, pyrryl, pyrrolidyl, piperidino, and C-alkylated piperidine, the alkyl group having from one to six carbon atoms and the non-toxic acid addition salts thereof.

2. A pharmaceutical composition comprising a compound as claimed in claim 1 together with a pharmaceutically acceptable carrier.

3. A process for preparing a compound as claimed in claim 1, which comprises reacting, in a polar organic solvent medium, a compound chosen from the group consisting of the corresponding 21-iodo, 21-bromo and 21-sulfonyl ester-corticosteroids with a nitrogen compound chosen from the group consisting of ammonia, monoalkylamines, dialkylamines, phenylamine, pyridylamine, benzylamine, picolinylamine, N-alkyl-N-phenylamines, N-alkyl-N-pyridylamines, morpholine, pyrrole, pyrrolidine, piperidine and C-alkylated piperidine wherein the alkyl radical has from one to six carbon atoms at a temperature in the range of from about 20° C. to about 200° C. for a time period of from about 15 minutes to about 24 hours.

4. 21 - N-piperidino-9α-fluoro - Δ⁴ - pregnene-11β,17α-diol-3,20-dione.

5. 21 - N-piperidino - 9α - fluoro - Δ¹,⁴ - pregnadiene-11β,17α-diol-3,20-dione.

6. 21 - N-piperidino - 9α - fluoro - Δ⁴,⁶ - pregnadiene-11β,17α-diol-3,20-dione.

7. 21 - N-piperidino - 9α-fluoro - Δ¹,⁴,⁶ - pregnatriene-11β,17α-diol-3,20-dione.

References Cited in the file of this patent

UNITED STATES PATENTS

| | | |
|---|---|---|
| 2,664,428 | Miescher | Dec. 29, 1953 |
| 2,665,274 | Conbere | Jan. 5, 1954 |
| 2,708,202 | Pfister | May 10, 1955 |
| 2,813,094 | Nysted | Nov. 12, 1957 |

UNITED STATES PATENT OFFICE
CERTIFICATE OF CORRECTION

Patent No. 2,920,999            January 12, 1960

Eugene J. Agnello et al.

It is hereby certified that error appears in the printed specification of the above numbered patent requiring correction and that the said Letters Patent should read as corrected below.

Column 4, line 25, for the superscript "4,6" read -- 1,4 --.

Signed and sealed this 2nd day of August 1960.

(SEAL)
Attest:
KARL H. AXLINE
Attesting Officer

ROBERT C. WATSON
Commissioner of Patents